(12) United States Patent
Takahashi et al.

(10) Patent No.: US 6,548,927 B2
(45) Date of Patent: Apr. 15, 2003

(54) ECCENTRIC ORBITING TYPE DRIVING APPARATUS

(75) Inventors: Mineo Takahashi, Yochiyo (JP); Naotake Yoneda, Tokyo (JP)

(73) Assignee: A & A Corporation, Tokyo (JP)

( * ) Notice: Subject to any disclaimer, the term of this patent is extended or adjusted under 35 U.S.C. 154(b) by 0 days.

(21) Appl. No.: 09/932,028

(22) Filed: Aug. 20, 2001

(65) Prior Publication Data

US 2002/0047372 A1 Apr. 25, 2002

Related U.S. Application Data

(63) Continuation of application No. PCT/JP00/09019, filed on Dec. 20, 2000.

(30) Foreign Application Priority Data

Dec. 21, 1999 (JP) .......................................... 11-362444

(51) Int. Cl.[7] ................................................ H02K 7/75
(52) U.S. Cl. ............................ 310/82; 310/81; 451/357
(58) Field of Search ............................... 310/80, 81, 82, 310/83, 114; 75/116, 570; 418/55.3, 55.4, 55.5

(56) References Cited

U.S. PATENT DOCUMENTS

| 4,946,353 A | * | 8/1990 | Crofoot | ....................... 417/410 |
|---|---|---|---|---|
| 5,002,470 A | * | 3/1991 | Gormley et al. | ............. 417/410 |
| 5,603,614 A | * | 2/1997 | Sakata et al. | ............... 418/55.2 |
| 6,261,072 B1 | * | 7/2001 | Abe et al. | ................... 418/55.3 |
| 6,267,572 B1 | * | 7/2001 | Suefuji et al. | .................. 418/5 |

FOREIGN PATENT DOCUMENTS

| JP | 57-24486 | * | 2/1982 | ........... F04C/18/04 |
|---|---|---|---|---|
| JP | 61-95865 | | 5/1986 | |
| JP | 63-138180 | | 6/1988 | ........... F04C/18/02 |
| JP | 4-121474 | * | 4/1992 | ........... F04C/18/02 |
| JP | 6066278 | | 3/1994 | |
| JP | 2001-178072 | * | 6/2001 | .......... H02K/7/075 |
| JP | 2001-304143 | * | 10/2001 | ........... F04C/18/02 |
| JP | 2002-21754 | * | 1/2002 | ........... F04C/18/02 |

* cited by examiner

Primary Examiner—Karl Tamai
(74) Attorney, Agent, or Firm—Rabin & Berdo, PC

(57) ABSTRACT

A stator (2) is fixed to a casing (1). Bearing supports (5, 6) are fixed to the casing (1), and a rotary shaft (4) is rotatably supported by the bearing supports (5, 6) through bearings (7, 8). A rotor (3) is fixed to the rotary shaft (4), and an orbiting shaft (9) is supported eccentrically and rotatably by the rotary shaft (4) through bearings (10, 11). An upper end of the orbiting shaft (9) is protruded out of the casing (1). An orbiting plate (12) is fixed to the lower section of the orbiting shaft (9), and an Oldham's ring (13) having protrusions (14, 15) is provided between the bearing support (6) and the orbiting plate (12). Grooves (16, 17) orthogonal to each other are provided in the bearing support (6) and the orbiting plate (12), respectively, and the grooves (16, 17) are engaged with the protrusions (14, 15).

2 Claims, 5 Drawing Sheets

US 6,548,927 B2

ECCENTRIC ORBITING TYPE DRIVING APPARATUS

This application is a continuation of International Application Number PCT/JP00/09019, which was filed on Dec. 20, 2000.

TECHNICAL FIELD

The present invention relates to an eccentric orbiting type driving apparatus which eccentrically orbits about a given shaft and eccentrically drives without any self-rotation.

BACKGROUND ART

A conventional eccentric orbiting type driving apparatus includes a converting mechanism for converting rotational motion into eccentric orbiting motion, which is connected to a motor.

However, such an eccentric orbiting type driving apparatus involves a complicated structure and a high manufacturing cost.

The present invention has been made to solve the above problem. It is therefore an object of the present invention to provide an eccentric orbiting type driving apparatus having a simple structure and a low manufacturing cost.

DISCLOSURE OF THE INVENTION

In order to achieve this object, according to the present invention, there is provided an eccentric orbiting type driving apparatus comprising a casing, a stator fixed to the casing, a rotary shaft rotatably supported by the casing, a rotor fixed to the rotary shaft, an orbiting shaft supported eccentrically and rotatably by the rotary shaft, and anti-self-rotation means for preventing the self-rotation of the orbiting shaft.

In the above eccentric orbiting type driving apparatus, the orbiting shaft may be mounted within the rotary shaft. The orbiting shaft may also be provided with an orbiting plate fixed to the upper or lower section of the orbiting shaft. Each of the rotary shaft and the orbiting shaft may be supported at two points. In addition, a seal means may be provided between the casing and the orbiting shaft. An upper end or both ends of the orbiting shaft may be protruded out of the casing. The anti-self-rotation means may include an Oldham's ring.

Further, according to the present invention, there is provided an eccentric orbiting type driving apparatus comprising a casing, a stator fixed to the casing, a rotary shaft rotatably supported by the casing, a rotor fixed to the rotary shaft, an orbiting shaft supported eccentrically and rotatably by the rotary shaft, an orbiting plate fixed to the lower section of the orbiting shaft, and an anti-self-rotation means for preventing the self-rotation of the orbiting shaft, which is provided between the orbiting plate and the casing.

Furthermore, according to the present invention, there is provided an eccentric orbiting type driving apparatus comprising a casing, a stator fixed to the casing, a bearing support fixed by the casing, a rotary shaft rotatably supported by the bearing support through a bearing, a rotor fixed to the rotary shaft, an orbiting shaft supported eccentrically and rotatably by the rotary shaft through a bearing and having an upper end protruding from the casing, an orbiting plate fixed to the lower section of the orbiting shaft, an Oldham's Ling having a protrusion and provided between the bearing support and the orbiting plate, and grooves orthogonal to each other and provided in the bearing support and the orbiting plate, respectively, wherein the orthogonal grooves are engage with the protrusion to prevent the self-rotation of the orbiting shaft.

BEST MODE FOR CARRYING OUT THE INVENTION

Figure 1:
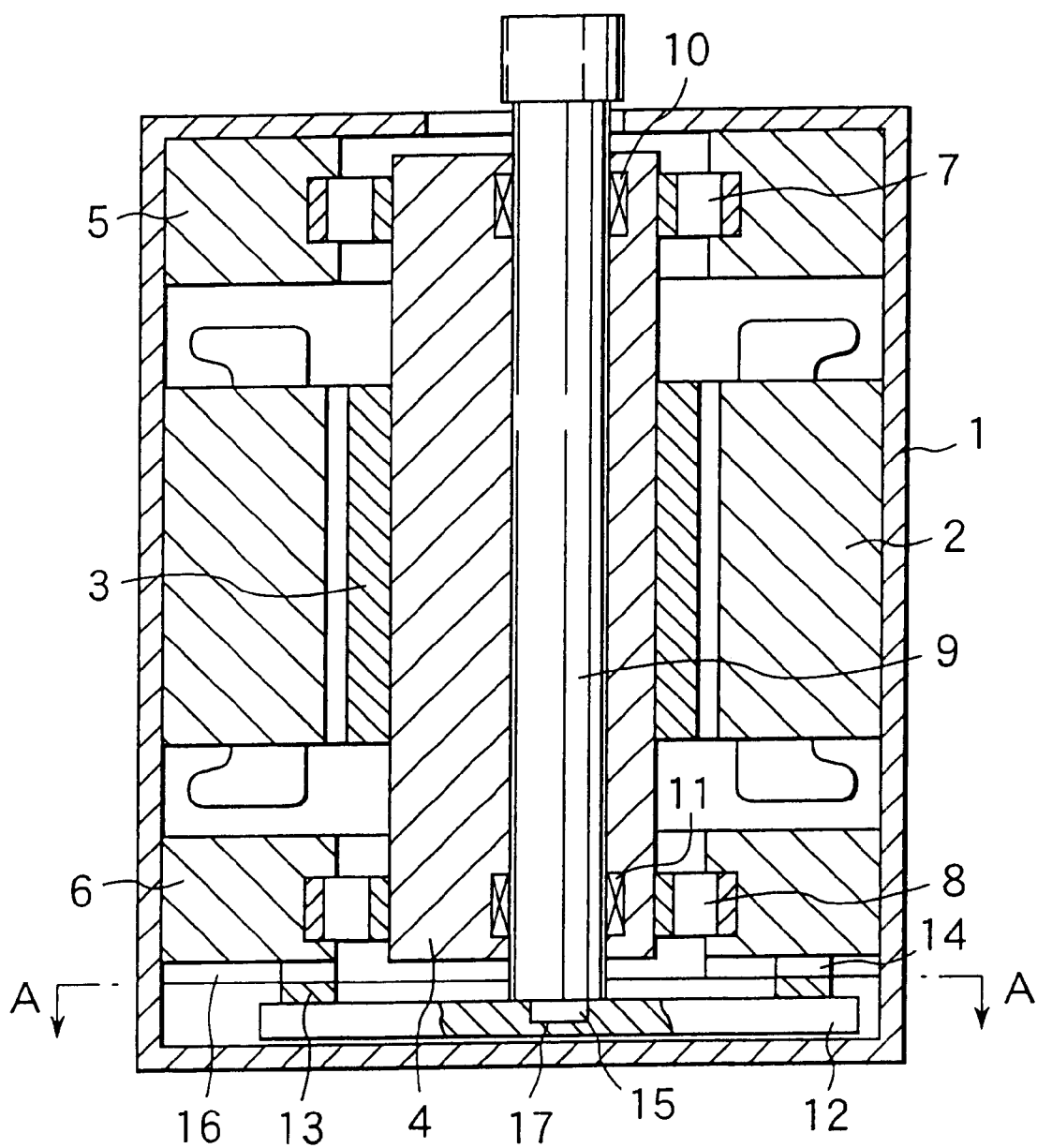
FIG. 1 is a schematic sectional view showing an eccentric orbiting type driving apparatus according to the present invention.
Figure 2:
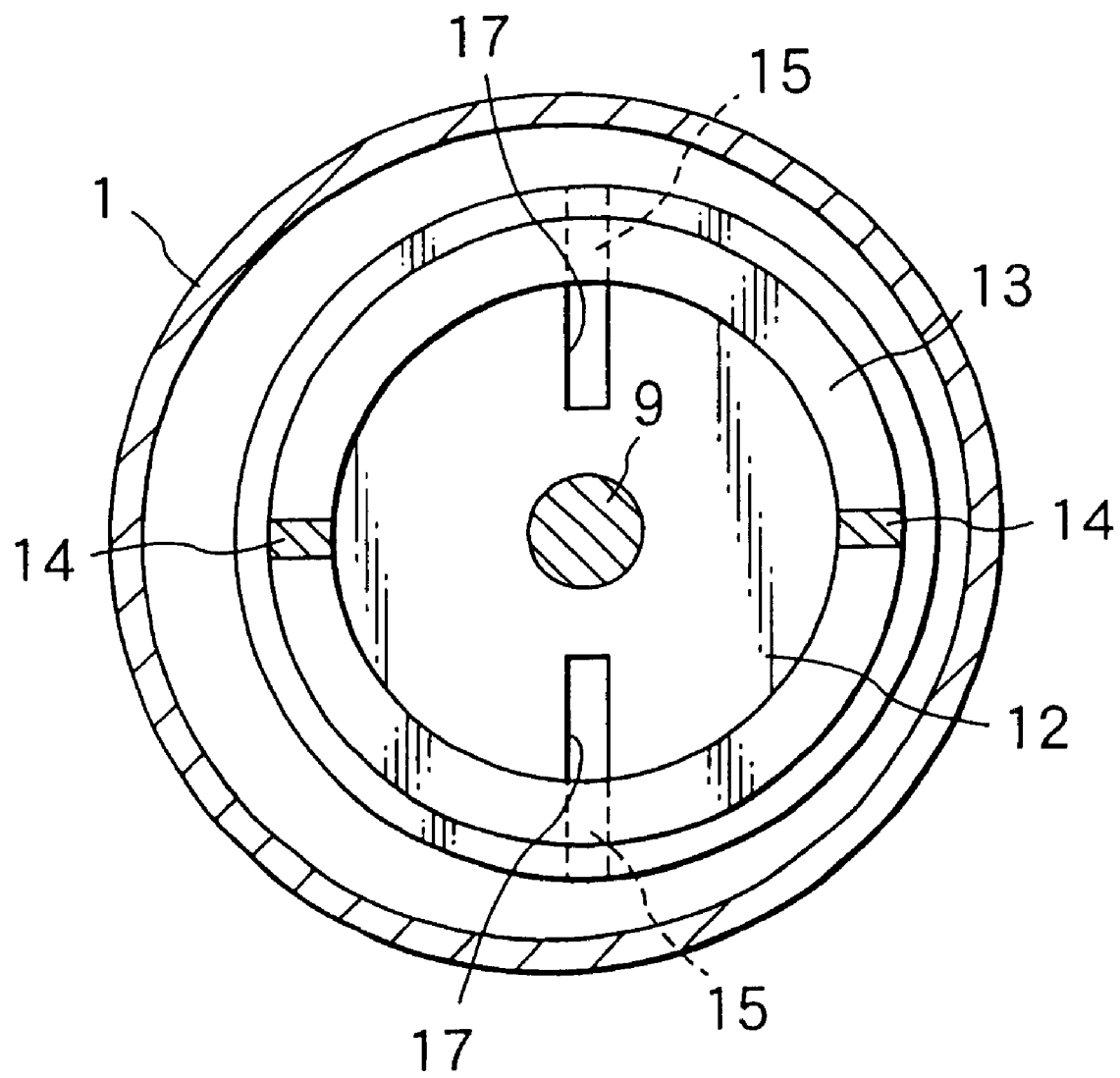
FIG. 2 is a sectional view taken along the line A—A of FIG. 1.

FIG. 1 is a schematic sectional view showing an eccentric orbiting type driving apparatus according to the present invention. FIG. 2 is a sectional view taken along the line A—A of FIG. 1. As shown in these figures, a stator 2 is fixed to a casing 1. Bearing supports 5 and 6 are fixed to the casing 1, and a rotary shaft 4 is rotatably supported by the bearing supports 5 and 6 through bearings 7 and 8. A rotor 3 is fixed to the rotary shaft 4. A motor is formed of the stator 2 and the rotor 3. An orbiting shaft 9 is rotatably supported by the rotary shaft 4 through bearings 10 and 11. The axis of the rotary shaft 4 is offset with respect to the axis of the orbiting shaft 9, and the upper end of the orbiting shaft 9 is protruded out of the casing 1. That is, the orbiting shaft 9 is supported eccentrically and rotatably by the rotary shaft 4. Further, an orbiting plate 12 is fixed to the lower section of the orbiting shaft 9, and an Oldham's ring 13 having protrusions 14 and 15 is provided between the bearing support 6 and the orbiting plate 12. The bearing support 6 and the orbiting plate 12 are provided with grooves 16 and 17, respectively. The grooves 16 and 17 are orthogonal to each other, and the protrusions 14 and 15 are engaged with the grooves 16 and 17, respectively. Thus, an anti-self-rotation means for preventing the self-rotation of the orbiting shaft 9 while allowing the eccentric orbiting of the orbiting shaft 9 is formed of the orbiting plate 12 and the Oldham's ring 13. That is, the anti-self-rotation means is provided between the orbiting plate 12 and the casing 1. Further, a converting means for converting rotational motion to eccentric orbiting motion is formed of the orbiting shaft 9, and the anti-self-rotation means.

In this eccentric orbiting type driving apparatus, the rotor 3 and the rotary shaft 4 are rotated by energizing a winding of the stator 2. While the orbiting shaft 9 is thereby eccentrically orbited about the axis of the rotary shaft 4, the self-rotation of the orbiting shaft 9 is prevented by virtue of the anti-self-rotation means composed of the Oldham' ring 13. Thus, the orbiting shaft 9 can be eccentrically orbited without any rotation with respect to the casing 1.

In such a eccentric orbiting type driving apparatus, providing the motor and converting means within the casing 1 leads to a simple structure and a low manufacturing cost. In addition, supporting each of the rotary shaft 4 and the orbiting shaft 9 at two points provides their stationary state.

This allows stable eccentric orbiting of the orbiting shaft 9, and thereby a wide application is yielded.

Figure 3:
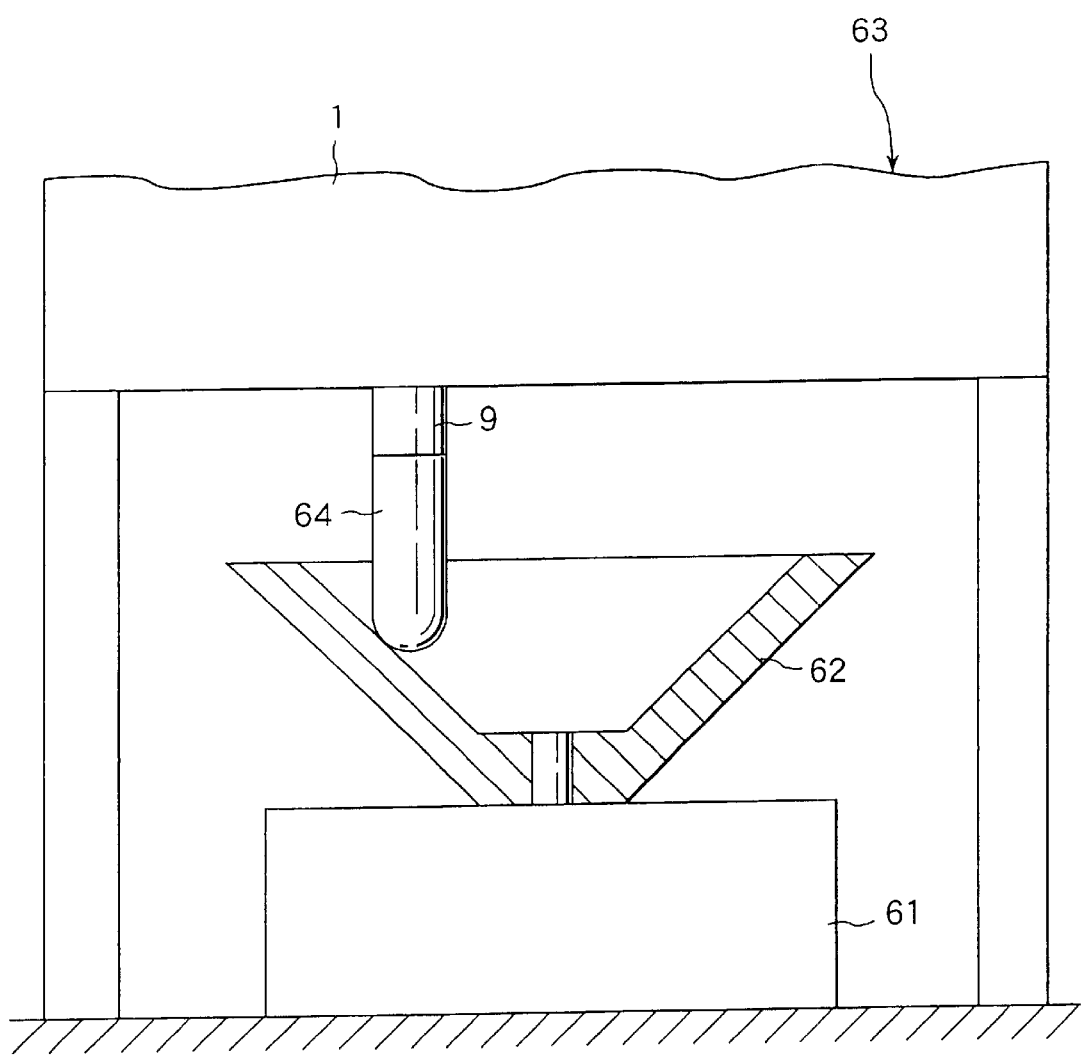
FIG. 3 is a schematic view showing the state when the eccentric orbiting type driving apparatus shown in FIGS. 1 and 2 is used as an apparatus of driving a pestle for a mortar.

FIG. 3 is a schematic view showing the state when the eccentric orbiting type driving apparatus 63 shown in FIGS. 1 and 2 is used as an apparatus for driving a work tool, such as a pestle for a mortar. As illustrated, a storage 61 and a mortar 62 fixed to the storage 61 are removably provided, and an eccentric orbiting type driving apparatus 63 is provided above the mortar 62. A pestle 64 is fixed to a protrusion, which is protruded out of the casing 1, of the orbiting shaft (output shaft) 9 of the eccentric orbiting type driving apparatus 63.

When the eccentric orbiting type driving apparatus 63 is driven and sesame seeds or the like are supplied from the upper side of the mortar 62, the orbiting shaft 9 is eccentrically orbited without any rotation with respect to the casing I and thereby the sesame seeds can be ground by the mortar 62 and the pestle 64. The ground sesame seeds or the like are stored in the storage 61.

Figure 4:
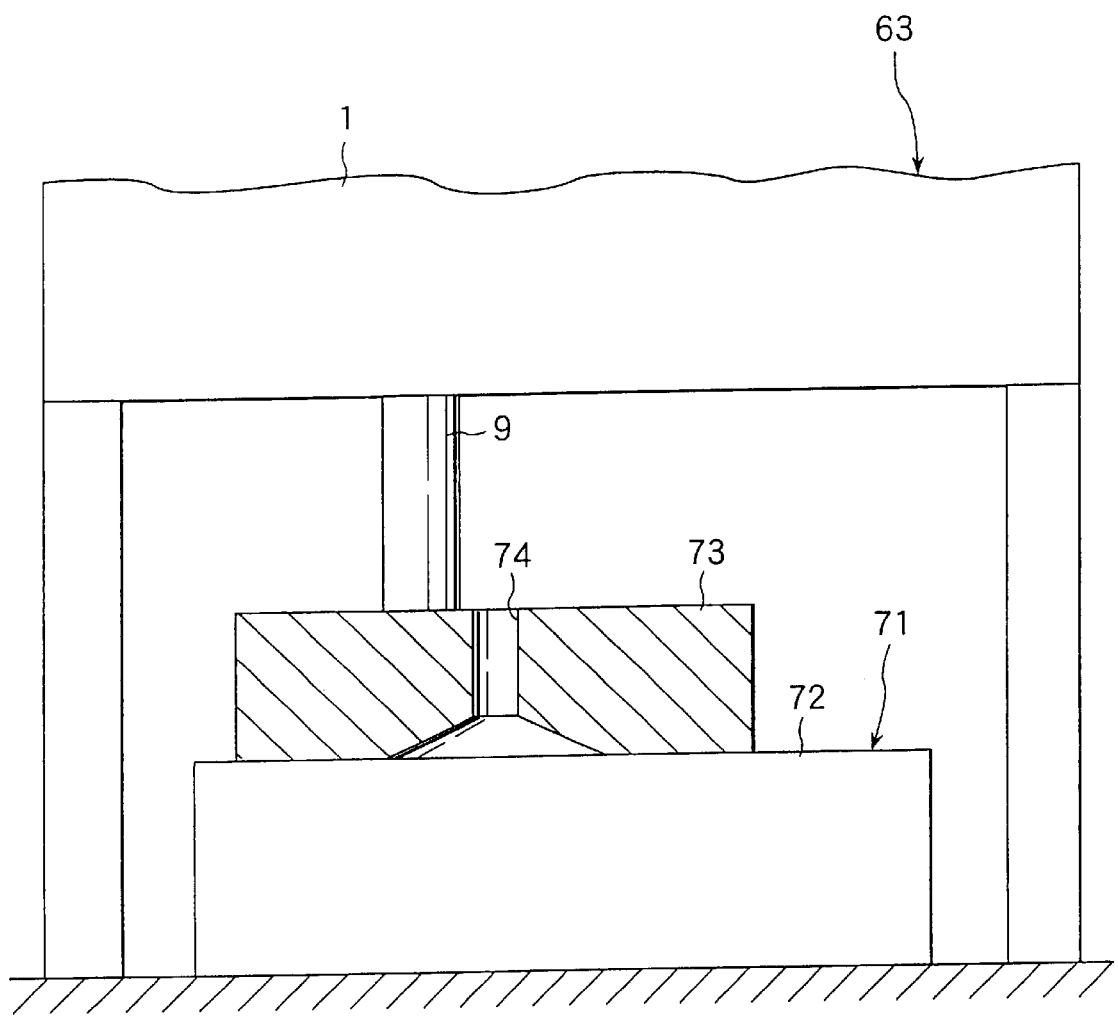
FIG. 4 is a schematic view showing the state when the eccentric orbiting type driving apparatus shown in FIGS. 1 and 2 is used as an apparatus for driving a stone mill.

FIG. 4 is a schematic view showing the state when the eccentric orbiting type driving apparatus shown in FIGS. 1 and 2 is used as an apparatus for driving a work tool, such as a stone mill. As illustrated, the eccentric orbiting type driving apparatus 63 is provided above a stone mill 71 including a lower stone 72 and an upper stone 73. The upper stone 73 is fixed to a protrusion, which is protruded out of the casing 1, of the orbiting shaft (output shaft) 9 of the eccentric orbiting type driving apparatus 63.

When the eccentric orbiting type driving apparatus 63 is driven and buckwheat or the like is supplied from a hole 74 of the upper stone 73, the orbiting shaft 9 is eccentrically orbited without any rotation with respect to the casing 1 and thereby the upper stone 73 is eccentrically orbited without any rotation with respect to the lower stone 72. Thus, the buckwheat is ground by the stone mill 71. Further, the buckwheat or the like is reliably introduced between the upper stone 73 and the lower stone 72. Once introduced therebetween, it will never come out of between the upper and lower stones 73 and 72. This allows the buckwheat to be evenly ground and thereby a homogeneous buckwheat powder or the like having a uniform grain size can be obtained.

Figure 5:
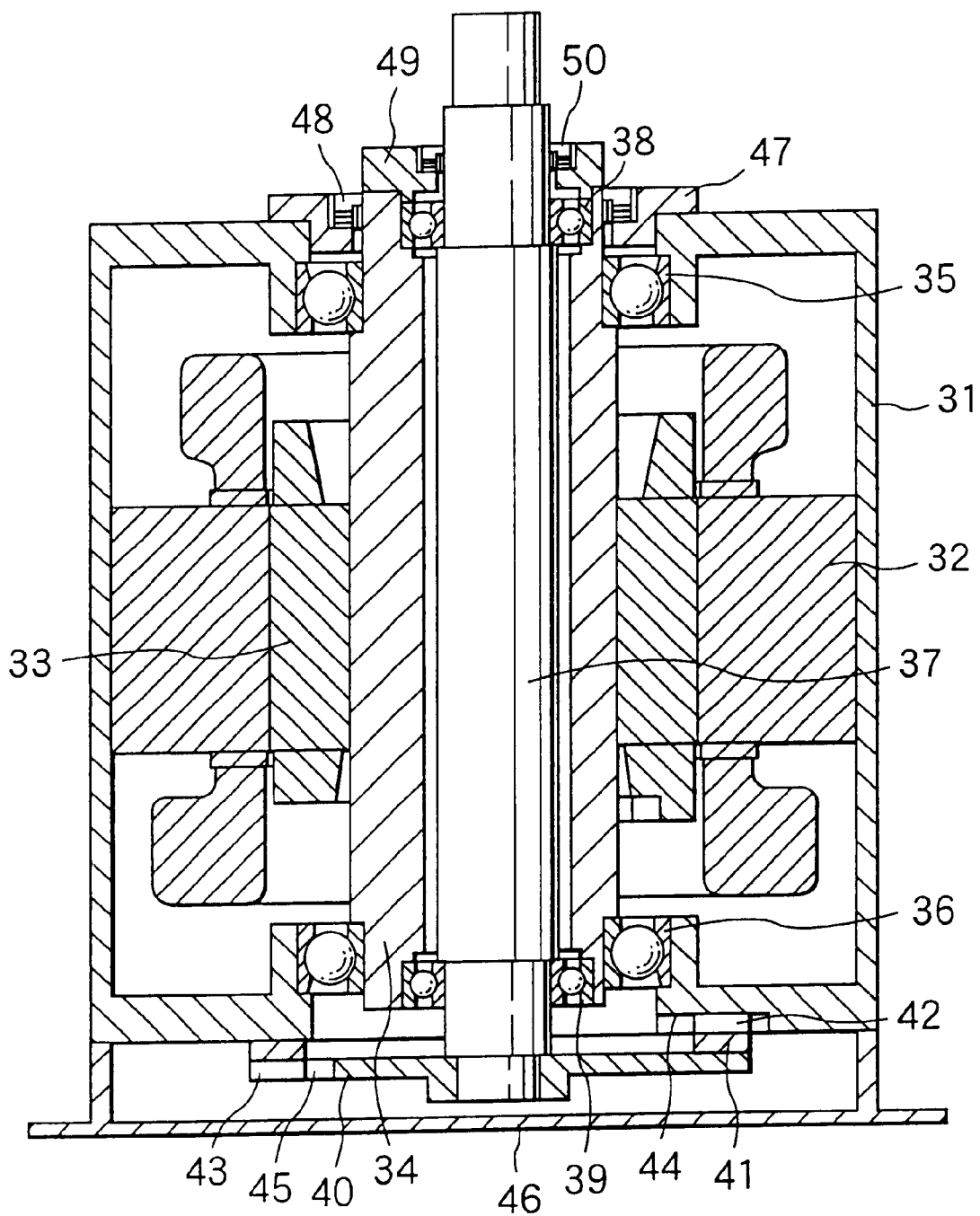
FIG. 5 is a schematic sectional view showing another eccentric orbiting type driving apparatus according to the present invention.

FIG. 5 is a schematic sectional view showing another eccentric orbiting type driving apparatus according to the present invention. As illustrated, a stator 32 is fixed to a casing 31, and a rotary shaft 34 is rotatably supported by the casing 31 through ball bearings 35 and 36. A rotor 33 is fixed to the rotary shaft 34. A motor is formed of the stator 32, and the rotor 33. Further, an orbiting shaft 37 is rotatably supported by the rotary shaft 34 through ball bearings 38 and 39. The axis of the rotary shaft 34 is offset with respect to the axis of the orbiting shaft 37, and the upper end of the orbiting shaft 37 is protruded out of the casing 31. That is, the orbiting shaft 37 is supported eccentrically and rotatably by the rotary shaft 34. Further, an orbiting plate 40 is fixed to the lower section of the orbiting shaft 37, i.e. the lower section of the drawing sheet, and an Oldham's ring 41 having protrusions 42 and 43 is provided between the casing 31 and the orbiting plate 40. The casing 31 is provided with a groove 44, and the orbiting plate 40 is provided with a slit 45. The groove 44 and the slit 45 are orthogonal to each other (In FIG. 5, while only one of the groove 44 and the slit 45 should be illustrated actually, both of them are shown to make explanation clear), and the protrusions 42 and 43 are engaged with the groove 44 and the slit 45, respectively. Thus, an anti-self-rotation means for preventing the self-rotation of the orbiting shaft 37 while allowing the eccentric orbiting of the orbiting shaft 37 is formed of the Oldham's ring 41 and others. That is, the anti-self-rotation means is provided between the orbiting plate 40 and the casing 31. Further, a converting means for converting rotational motion to eccentric orbiting motion is formed of the orbiting shaft 37, and the anti-self-rotation means. Further, a lid 46 is attached to the bottom of the casing 31, i.e. the lower section of the sheet of FIG. 5. A ring member 47 is attached liquid-tightly to the casing 31, and a seal 48 is provided between the ring member 47 and the rotary shaft 34. A ring member 49 is attached liquid-tightly to the rotary shaft 34, and a seal 50 is provided between the ring member 49 and the orbiting shaft 37.

In this eccentric orbiting type driving apparatus, the rotor 33 and the rotary shaft 34 are rotated by energizing a winding of the stator 32. While the orbiting shaft 37 is eccentrically orbited about the axis of the rotary shaft 34, the self-rotation of the orbiting shaft 37 is prevented by virtue of the anti-self-rotation means composed of the Oldham's ring 41. Thus, the orbiting shaft 37 is eccentrically orbited without any rotation with respect to the casing 31.

In such a eccentric orbiting type driving apparatus, the provided seals 48 and 50 can prevent outside gas from flowing into the eccentric orbiting type driving apparatus. This protects the eccentric orbiting type driving apparatus from undesirable damages and provides its long life.

While the orbiting plate 12, 40 is fixed to the lower section of the orbiting shaft 9, 37 in the above embodiments, the orbiting plate may be fixed to any other section of the orbiting shaft. If an orbiting plate is fixed to the upper section of an orbiting shaft, the affect of torsion in the orbiting shaft can be reduced. Further, while the upper end of the orbiting shaft 9, 37 is protruded out of the casing 1, 31 in the above embodiments, both ends of the orbiting shaft may be protruded out of the casing. Further, while the eccentric orbiting type driving apparatus is used as an apparatus for driving the stone mill or the like in the above embodiment, it may also be used as a sheet feeding device of copiers. In addition, while the stone mill or the like is provided outside the casing 1 in the above embodiment, a suitable device driven by the eccentric orbiting type driving apparatus may be provided within the casing.

In the eccentric orbiting type driving apparatus according to the present invention, a simple structure and a low manufacturing cost can be achieved by providing the motor and the converting means within the casing.

What is claimed is:

1. An eccentric orbiting type driving apparatus, comprising:

a casing;

a stator fixed to said casing;

a rotary shaft rotatably supported by said casing;

a rotor fixed to said rotary shaft;

an orbiting shaft supported eccentrically and rotatably by said rotary shaft, said orbiting shaft having an upper end that protrudes out of said casing, the upper end being adapted to drive a work tool located external to said casing;

an orbiting plate fixed to a lower section of said orbiting shaft and being disposed within said casing; and an anti-self-rotation means for preventing the self-rotation of said orbiting shaft, so that said orbiting shaft does not rotate relative to said casing while the orbiting shaft eccentrically orbits, said anti-self-rotation means being engaged with said orbiting plate and being provided at the lower section of said orbiting shaft and adjacent to said orbiting plate.

2. An eccentric orbiting type driving apparatus, comprising:

a casing;

a stator fixed to said casing;

a bearing support fixed to said casing;

a rotary shaft rotatably supported by said bearing support through a bearing;

a rotor fixed to said rotary shaft;

an orbiting shaft supported eccentrically and rotatably by said rotary shaft through a bearing, said orbiting shaft having an upper end protruding out of said casing, the upper end being adapted to drive a work tool located external to said casing;

an orbiting plate fixed to the lower section of said orbiting shaft and being disposed within said casing;

an Oldham's ring having a protrusion, said Oldham's ring being provided between said bearing support and said orbiting plate; and grooves orthogonal to each other, said groves being provided in said bearing support and said orbiting plate, respectively, wherein said orthogonal grooves are engage with said protrusion to prevent the self-rotation of said orbiting shaft.

* * * * *